United States Patent
Zheng

(10) Patent No.: US 12,200,050 B2
(45) Date of Patent: Jan. 14, 2025

(54) DATA RESOURCE STORAGE METHOD AND APPARATUS, DATA RESOURCE QUERY METHOD AND APPARATUS, AND ELECTRONIC DEVICE

(71) Applicant: BOE Technology Group Co., Ltd., Beijing (CN)

(72) Inventor: Haitao Zheng, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/264,458

(22) PCT Filed: Oct. 28, 2021

(86) PCT No.: PCT/CN2021/127095
§ 371 (c)(1),
(2) Date: Aug. 7, 2023

(87) PCT Pub. No.: WO2023/070452
PCT Pub. Date: May 4, 2023

(65) Prior Publication Data
US 2024/0106889 A1 Mar. 28, 2024

(51) Int. Cl.
*H04L 67/1074* (2022.01)
*H04L 45/7453* (2022.01)
(52) U.S. Cl.
CPC ...... *H04L 67/1074* (2013.01); *H04L 45/7453* (2013.01)
(58) Field of Classification Search
CPC .................... H04L 45/7453; H04L 67/1074
See application file for complete search history.

(56) References Cited

U.S. PATENT DOCUMENTS 9,088,577 B2 * 7/2015 Zhu .................. H04L 67/1001
2015/0295965 A1 * 10/2015 Mäenpää ............. H04N 7/15
709/204

(Continued)

FOREIGN PATENT DOCUMENTS

CN 101364996 A 2/2009
CN 101741731 A 6/2010

(Continued)

OTHER PUBLICATIONS

Xie et al., "A Fast Hybrid Data Sharing Framework for Hierarchical Mobile Edge Computing", IEEE Conference on Computer Communications, Jul. 6, 2020.*

(Continued)

*Primary Examiner* — Todd L Barker
(74) *Attorney, Agent, or Firm* — Calfee, Halter & Griswold LLP

(57) ABSTRACT

A data resource storage method includes: in response to an edge computing server acquiring a first data resource, storing, on the basis of a first distributed hash routing table maintained by the edge computing server and a hash value for uniquely identifying the first data resource, the first data resource in at least one edge computing server in an edge node to which the edge computing server belongs; and in response to the edge node acquiring a second data resource, storing, on the basis of a second distributed hash routing table maintained by the edge node and a hash value for uniquely identifying the second data resource, the second data resource in at least one edge node in an edge computing system.

15 Claims, 7 Drawing Sheets

(56) References Cited

U.S. PATENT DOCUMENTS

| | | | | |
|---|---|---|---|---|
| 2017/0142226 A1* | 5/2017 | De Foy | ............... | H04L 67/104 |
| 2018/0103013 A1* | 4/2018 | Imai | .................. | H04L 63/061 |
| 2018/0167449 A1 | 6/2018 | Zhu et al. | | |

FOREIGN PATENT DOCUMENTS

| | | | |
|---|---|---|---|
| CN | 102143199 | A | 8/2011 |
| CN | 103139076 | A | 6/2013 |
| CN | 109274745 | A | 1/2019 |
| CN | 109995868 | A | 7/2019 |
| CN | 110633144 | A | 12/2019 |
| CN | 111064798 | A | 4/2020 |
| CN | 112187907 | A | 1/2021 |
| CN | 112699094 | A | 4/2021 |
| CN | 113220214 | A | 8/2021 |
| WO | 2013075636 | A1 | 5/2013 |

OTHER PUBLICATIONS

Duan et al., "A novel load balancing scheme for mobile edage computing", Journal of Systems and Software, vol. 186, Apr. 2022.*

Khethavath et al., "Towards an efficient distributed cloud computing architecture ", Peer to Peer Networking and Applications, vol. 10, May 31, 2016,m pp. 1152-1168.*

Ozkasap et al., "DHT-baed Edge and Fog Computing Systems: Infrastructures and Applications", IEEE Conference on Computer Communications Workshops, May 2022, IEEE Publishing.*

Nikoloudakis et al., "Edge Caching Architecture for Media Delivery over P2P Networks", IEEE 23rd International Workshop on Computer Aided Modeling and Design of Communication Links and Networks, Sep. 2018.*

Yoon et al., "Reducing the Discovery Overheads in a DHT Based P2P Network by Using Virtual Resources", 2008 19th International Conference on Systems Engineering, Aug. 2008.*

T. Siyu, "Research and Verification System of Key Technologies on Edge Control System for IoT Applications", Thesis submitted to Nanjing University of Posts and Telecommunications for the Degree of Master of Engineering, Apr. 2020, 82 pgs. (Separated into two attachments due to size limitations).

A. Rabay'a, et al. "Fog Computing with P2P: enhancing fog computing bandwidth for IoT scenarios", IEEE, 2019, 8 pgs.

Written Opinion from PCT/CN2021/127095 dated Jul. 28, 2022.

International Search Report from PCT/CN2021/127095 dated Jul. 28, 2022.

* cited by examiner

DATA RESOURCE STORAGE METHOD AND APPARATUS, DATA RESOURCE QUERY METHOD AND APPARATUS, AND ELECTRONIC DEVICE

CROSS-REFERENCE OF RELATED APPLICATION

The present disclosure is a National Stage of International Application No. PCT/CN2021/127095, filed on Oct. 28, 2021, the contents of all of which are incorporated herein by reference in their entirety for all purpose.

TECHNICAL FIELD

The present disclosure relates to the technical field of the Internet of Things, and in particular to data resource storage method and apparatus, data resource query method and apparatus, non-volatile computer-readable storage medium, and electronic device.

BACKGROUND

Multi-Access Edge Computing (MEC) is a distributed computing architecture. Under this architecture, business requests such as data services will be distributed to edge computing servers for processing. Since the edge computing server is closer to the user terminal, it can speed up the processing efficiency of business requests, reduce delays, and improve data real-time performance; at the same time, it reduces the pressure on the cloud.

However, in the existing edge computing system, the edge nodes and the cloud, and the edge computing servers in the edge nodes still rely heavily on the centralized architecture, which in turn will affect the associated nodes once a key node has a problem.

It should be noted that the information disclosed in the above background section is only for enhancing the understanding of the background of the present disclosure, and therefore may include information that does not constitute the prior art known to those of ordinary skill in the art.

SUMMARY

The present disclosure provides data resource storage method and apparatus, data resource query method and apparatus, non-volatile computer-readable storage medium, and electronic device, thereby reducing the dependence on the centralized architecture at least to a certain extent and improving system stability.

According to one aspect of the present disclosure, a data resource storage method is provided, which is applied to an edge computing system, the edge computing system includes a plurality of edge nodes and at least one of the edge nodes includes a plurality of edge computing servers, the data resource storage method includes: in response to the edge computing server obtaining a first data resource, storing the first data resource in at least one edge computing server in an edge node to which the edge computing server belongs based on a first distributed hash routing table maintained by the edge computing server and a hash value for uniquely identifying the first data resource; in response to the edge node obtaining a second data resource, storing the second data resource in at least one edge node in the edge computing system based on a second distributed hash routing table maintained by the edge node and a hash value for uniquely identifying the second data resource; where the edge computing servers in the edge node to which the edge computing server belongs form a first P2P network; and edge nodes in the edge computing system form a second P2P network.

In an exemplary embodiment of the present disclosure, the method further includes: obtaining associated information of the first data resource, wherein the associated information includes a keyword that uniquely identifies the first data resource or a keyword generating method; and calculating the hash value for uniquely identifying the first data resource based on the keyword of the first data resource; obtaining associated information of the second data resource, wherein the associated information comprises a keyword that uniquely identifies the second data resource or a keyword generating method; and calculating the hash value for uniquely identifying the second data resource based on the keyword of the second data resource.

In an exemplary embodiment of the present disclosure, the method further includes: after the edge computing server obtains the first data resource, in response to that the edge node to which the edge computing server belongs cannot store the first data resource, storing, by the edge node to which the edge computing server belongs, the first data resource in at least one edge node in the edge computing system based on the second distributed hash routing table and the hash value for uniquely identifying the first data resource.

In an exemplary embodiment of the present disclosure, the edge computing server has an identifier of the edge computer server, and a value range of the identifier of the edge computer server is same as a value range of the hash value for uniquely identifying the first data resource; storing the first data resource in at least one edge computing server in the edge node to which the edge computing server belongs includes: obtaining the identifier of the edge computing server; calculating a first logical distance between the hash value for uniquely identifying the first data resource and the identifier of the edge computing server; and determining a target edge computing server according to the first distributed hash routing table and the first logical distance, and storing the first data resource in the target edge computing server.

In an exemplary embodiment of the present disclosure, the edge node has an identifier of the edge node, and a value range of the identifier of the edge node is same as a value range of the hash value for uniquely identifying the second data resource; storing the second data resource in at least one edge node in the edge computing system includes: obtaining the identifier of the edge node; calculating a second logical distance between the hash value for uniquely identifying the second data resource and the identifier of the edge node; and determining a target edge node according to the second distributed hash routing table and the second logical distance, and storing the second data resource in the target edge node.

According to one aspect of the present disclosure, a data resource query method is provided, which is applied to an edge computing system. The edge computing system includes a plurality of edge nodes and at least one of the edge nodes includes a plurality of edge computing servers. The data resource query method includes: obtaining, by the edge computing server, a hash value for uniquely identifying a target data resource based on a data query request, and determining a target edge computing server storing the target data resource in the edge node to which the edge computing server belongs by combining a first distributed hash routing table maintained by the edge computing server and the hash value for uniquely identifying a target data resource, so as to read the target data resource from the target edge computing server; and/or obtaining, by the edge node, a hash value for uniquely identifying a target data resource based on a data query request, and determining a target edge node storing the target data resource in the edge nodes of the edge computing system by combining a second distributed hash routing table maintained by the edge node and the hash value for uniquely identifying the target data resource, so as to read the target data resource from the target edge node; where the edge computing servers in the edge node to which the edge computing server belongs form a first P2P network; and the edge nodes in the edge computing system form a second P2P network.

In an exemplary embodiment of the present disclosure, the method further includes: obtaining associated information of the target data resource, wherein the associated information includes a keyword that uniquely identifies the target data resource or a keyword generating method; and calculating the hash value for uniquely identifying the target data resource based on the keyword of the target data resource.

In an exemplary embodiment of the present disclosure, the determining the target edge computing server storing the target data resource includes: obtaining an identifier of the edge computing server; calculating a first logical distance between the hash value for uniquely identifying the target data resource and the identifier of the edge computing server; determining a candidate edge computing server according to the first distributed hash routing table and the first logical distance, so as to determine whether the candidate edge computing server is the target edge computing server storing the target data resource.

In an exemplary embodiment of the present disclosure, the determining the target edge node storing the target data resource includes: obtaining an identifier of the edge node; calculating a second logical distance between the hash value for uniquely identifying the target data resource and the identifier of the edge node; determining a candidate edge node according to the second distributed hash routing table and the second logical distance, so as to determine whether the candidate edge node is the target edge node storing the target data resource.

According to one aspect of the present disclosure, an edge computing system is provided, the edge computing system includes a plurality of edge nodes and at least one of the edge nodes includes a plurality of edge computing servers; where: the plurality of edge computing servers form a first P2P network based on a first distributed hash routing table, and the edge computing servers store hash values for identifying data resources stored thereon; the plurality of edge nodes form a second P2P network based on a second distributed hash routing table, and the edge nodes store hash values for identifying data resources stored thereon.

According to one aspect of the present disclosure, a data resource storage apparatus is provided, which is applied to an edge computing system, the edge computing system includes a plurality of edge nodes and at least one of the edge nodes includes a plurality of edge computing servers. The data resource storage apparatus includes: a first storage module configured to store a first data resource in at least one edge computing server in the edge node to which the edge computing server belongs based on a first distributed hash routing table maintained by the edge computing server and a hash value for uniquely identifying the first data resource in response to the edge computing server obtaining the first data resource; a second storage module configured to store a second data resource in at least one edge node in the edge computing system based on a second distributed hash routing table maintained by the edge node and a hash value for uniquely identifying the second data resource in response to the edge node obtaining the second data resource; where edge computing servers in the edge node to which the edge computing server belongs form a first P2P network; and edge nodes in the edge computing system form a second P2P network.

According to one aspect of the present disclosure, a data resource query apparatus is provided, which is applied to an edge computing system, the edge computing system includes a plurality of edge nodes and at least one of the edge nodes includes a plurality of edge computing servers. The data resource query apparatus includes: a first query module configured to enable the edge computing server to obtain a hash value for uniquely identifying a target data resource based on a data query request, and enable the edge computing server to determine a target edge computing server storing the target data resource in the edge node to which the edge computing server belongs by combining a first distributed hash routing table maintained by the edge computing server and the hash value for uniquely identifying the target data resource, so as to read the target data resource from the target edge computing server; and/or a second query module configured to enable the edge node to obtain a hash value for uniquely identifying a target data resource based on a data query request, and enable the edge node to determine a target edge node storing the target data resource in the edge nodes of the edge computing system by combining a second distributed hash routing table maintained by the edge node and the hash value for uniquely identifying the target data resource, so as to read the target data resource from the target edge node; where the edge computing servers in the edge node to which the edge computing server belongs form a first P2P network; and the edge nodes in the edge computing system form a second P2P network.

According to one aspect of the present disclosure, there is provided an electronic device, including: a processor; and a memory for storing one or more programs, and when the one or more programs are executed by the processor, the processor implements the methods as provided by some aspects of the present disclosure.

According to one aspect of the present disclosure, there is provided a computer-readable storage medium, on which a computer program is stored, and when the program is executed by a processor, the method as provided in some aspects of the present disclosure is implemented.

It is to be understood that both the foregoing general description and the following detailed description are exemplary and explanatory only and are not restrictive of the present disclosure.

BRIEF DESCRIPTION OF THE DRAWINGS

The accompanying drawings, which are incorporated in and constitute a part of this specification, illustrate embodiments consistent with the disclosure and together with the description serve to explain the principles of the disclosure. Apparently, the drawings in the following description are only some embodiments of the present disclosure, and those skilled in the art can obtain other drawings according to these drawings without creative efforts.

DETAILED DESCRIPTION

Figure 1:
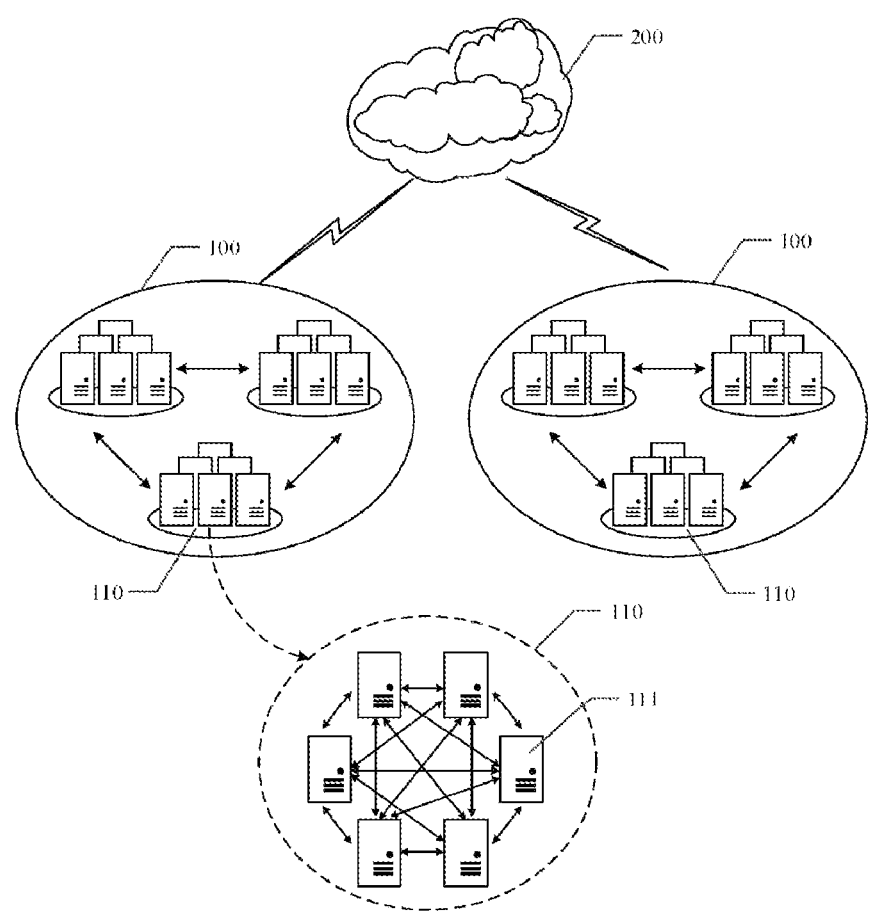
FIG. 1 shows a schematic diagram of an architecture of an edge computing system in an embodiment of the present disclosure.

Exemplary embodiments will now be described more fully with reference to the accompanying drawings. Exemplary embodiments may, however, be embodied in many forms and should not be construed as limited to the examples set forth herein; rather, these embodiments are provided so that this disclosure will be thorough and complete and will fully convey the concept of exemplary embodiments to those skilled in the art. The described features, structures, or characteristics may be combined in any suitable manner in one or more embodiments.

Furthermore, the drawings are merely schematic illustrations of the present disclosure and are not necessarily drawn to scale. The same reference numerals in the drawings denote the same or similar parts, and thus repeated descriptions thereof will be omitted. Some block diagrams shown in the drawings are functional entities and do not necessarily correspond to physically or logically separate entities. These functional entities may be implemented in software, or in one or more hardware modules or integrated circuits, or in different network and/or processor device and/or microcontroller device.

It should be noted that in the present disclosure, the terms "including", "configured with", and "disposed at" are used to express an open and inclusive meaning, and indicate that there may be other elements/components/etc. in addition to the listed ones.

FIG. 1 shows a schematic diagram of an exemplary edge computing system to which the data resource storage method of the embodiment of the present disclosure can be applied. In the edge computing system, at least a plurality of edge nodes 110 are included; an edge node 110 may include a plurality of edge computing servers 111. Among them, the edge computing server 111 can provide cloud-based service environment and computing capabilities in the wireless access network close to the user terminal. The edge computing server 111 can be an independent server, or other hardware module or software module which can provide edge computing services or process edge computing services. For example, the edge computing server 111 may be an edge device management server, an edge data storage server, an edge rule engine server, an edge aggregation server, or other edge computing server. In some exemplary embodiments, the edge computing server 111 may also include user terminal, such as desktop computer, laptop computer, smart phone, tablet computer, camera or sensor.

In some exemplary embodiments, an edge cloud 100 can be formed among a plurality of edge nodes 110, and the edge cloud 100 can communicate with the management cloud 200 to realize overall scheduling and management functions through the management cloud 200. For example, management function such as registration and activation of edge nodes can be performed on the management cloud 200, and Global Server Load Balance (GSLB) technology can also be utilized to direct user service requests to appropriate edge nodes for processing through management cloud 200. In addition, it should be understood that the numbers of edge computing servers and edge nodes in FIG. 1 are only illustrative. According to implementation requirements, there may be other numbers of edge computing servers and edge nodes.

In this exemplary embodiment, the edge computing servers 111 in the edge node can form a first layer of P2P (Peer-to-Peer) network (hereinafter referred to as the first P2P network) based on the DHT (Distributed Hash Table, distributed hash routing table) topology algorithm. The edge nodes 110 can also form a second layer of P2P network (hereinafter referred to as the second P2P network) based on the DHT topology algorithm.

Figure 2:
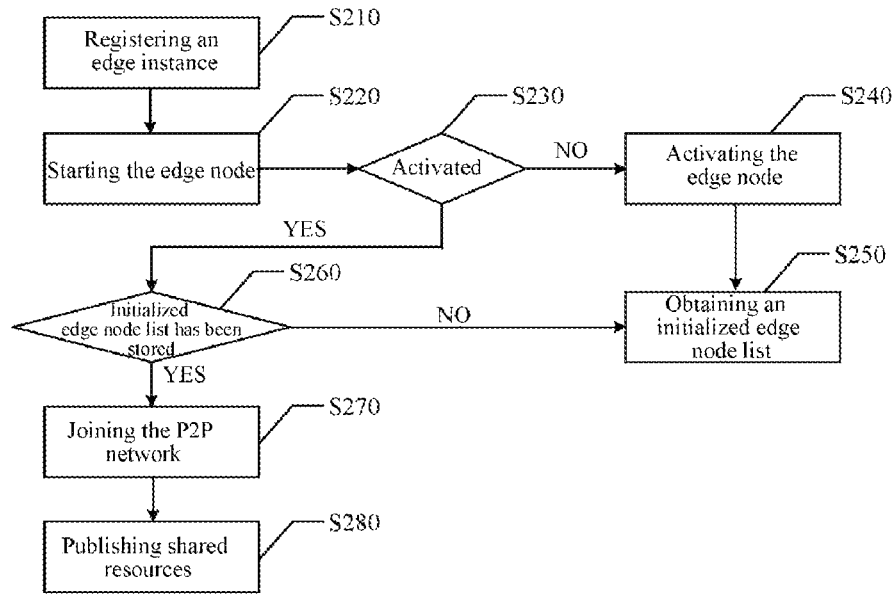
FIG. 2 shows a schematic flow chart of a new edge node joining a P2P network in an embodiment of the present disclosure.

For example, as shown in FIG. 2, a new edge node may join the P2P network through the following steps S210 to S260. In particular:

Step S210, registering an edge instance on the above-mentioned management cloud 200.

Step S220, deploying a new edge node, and starting the new edge node.

Step S230, judging whether the new edge node has been activated by the management cloud 200; if not, activating the new edge node in step S240 and obtaining an initialized edge node list in step S250.

Step S260, if it is judged in step S230 that the new edge node has been activated, then judging whether the new edge node has an initialized edge node list; if not, obtaining the initialized edge node list in step S250.

Step S270, adding a new edge node to the to-be-added P2P network according to the initialized edge node list. For example, the unique identifier of the new edge node is firstly generated by a hash algorithm. Secondly, according to the unique identifier of the new edge node and the initialized edge node list, the list of edge nodes close to the new edge node and routing information, and adding them to the to-be-added P2P network.

Step S280, publishing the shareable resource to the P2P network.

Figure 3:
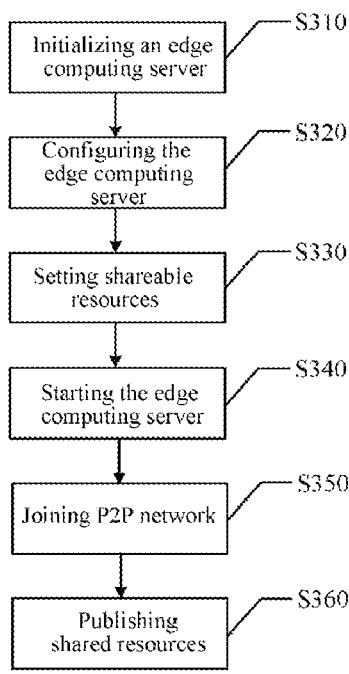
FIG. 3 shows a schematic flowchart of a new edge computing server joining a P2P network in an embodiment of the present disclosure.

For example, as shown in FIG. 3, similarly, a new edge computing server may join the P2P network through the following steps S310 to S360. In particular:

Step S310, initializing a new edge computing server to be added to the P2P network.

Step S320, configuring the initialized new edge computing server. For example, the configuration information may include information about the edge node where the new edge computing server is located, information about known edge computing servers in the to-be-added P2P network, and the like.

Step S330, setting resources that the new edge computing server can share.

Step S340, starting the edge computing node.

Step S350, adding the new edge computing server to the P2P network formed by other edge computing servers in the edge node according to the configuration information in step S320. For example, a unique identifier of a new edge computing server is first generated through a hash algorithm. Secondly, according to the unique identifier of the new edge computing server and the configuration information in step S320, the list of edge computing servers close to the new edge computing server and routing information are obtained, and the new edge computing server is added to the to-be-added P2P network. After adding to the P2P network, the state of the new edge computing server can be synchronized to the P2P network.

Step S360, publishing the shareable resources set in step S330 to the P2P network.

Figure 4:
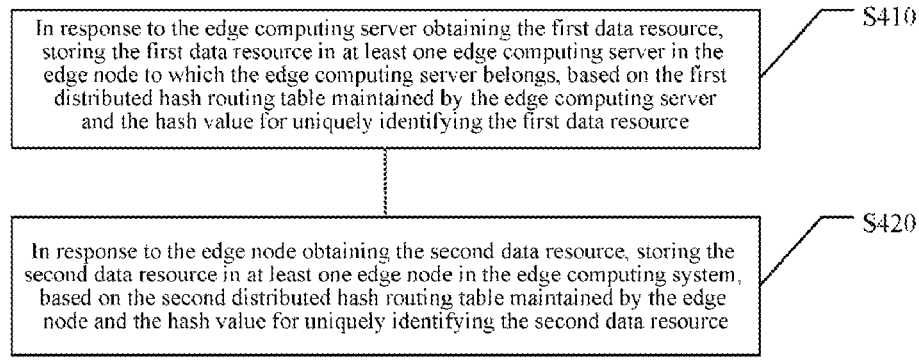
FIG. 4 shows a schematic flowchart of a method for storing data resources in an embodiment of the present disclosure.

This exemplary embodiment provides a method for storing data resources, which is applied to the above-mentioned edge computing system. Referring to FIG. 4, the method for storing data resources may include the following steps S410 to S420. In particular:

Step S410, in response to the edge computing server obtaining the first data resource, storing the first data resource in at least one edge computing server in the edge node to which the edge computing server belongs, based on the first distributed hash routing table maintained by the edge computing server and the hash value for uniquely identifying the first data resource.

Step S420, in response to the edge node obtaining the second data resource, storing the second data resource in at least one edge node in the edge computing system, based on the second distributed hash routing table maintained by the edge node and the hash value for uniquely identifying the second data resource.

Based on the data resource storage method provided by the exemplary embodiment of the present disclosure, the first level of P2P digital resource storage based on a distributed hash routing table is achieved by a plurality of edge computing servers included in the edge nodes, and the second level of P2P digital resource storage based on a distributed hash routing table is achieved by a plurality of edge nodes. On the one hand, since there is no need to rely on the centralized architecture, even if there is a problem with a key node, it will not affect its associated nodes; therefore, the stability and security of the system can be improved; on the other hand, the target edge computing server or target edge node used to store the data resource can be determined only depending on the hash values of data resources, thus reducing the coupling between nodes and further reducing the difficulty of deployment. On the further other hand, since there is no need to rely on a centralized architecture, nodes can directly communicate with each other, so the real-time performance of data transmission can be improved to a certain extent, thereby reducing delays and improving computing speed.

In the following, each step of the method for storing data resources in this exemplary embodiment will be described in more detail with reference to the drawings and embodiments.

In step S410, in response to the edge computing server obtaining the first data resource, storing the first data resource in at least one edge computing server in the edge nodes to which the edge computing server belongs, based on the first distributed hash routing table maintained by the edge computing server and the hash value for uniquely identifying the first data resource.

In this exemplary embodiment, the first data resource may be related information indicating edge computing server which provides content or related information indicating edge node which provides content. When the first data resource is such information, since the amount of data is small, hash conversion may be directly performed on the first data resource to obtain a hash value for uniquely identifying the first data resource. For example, in this exemplary embodiment, SHA-1 may be used to perform hash conversion on the first data resource to obtain a corresponding hash value. Wherein, SHA-1 is a cryptographic hash function with a hash space of 160 bits; therefore, the length of the generated hash value for uniquely identifying the first data resource is 160 bits, that is, 20 bytes. Of course, in other exemplary embodiments of the present disclosure, other hash functions such as MD5 and SHA-2 may also be used to calculate the hash value, which is not specifically limited in this exemplary embodiment. In some exemplary embodiments of the present disclosure, the first data resource may also be a static resource; and when the data amount of the static resource is small, a similar method may also be used to directly perform hash conversion on the first data resource, to obtain a hash value for uniquely identifying the first data resource.

Figure 5:
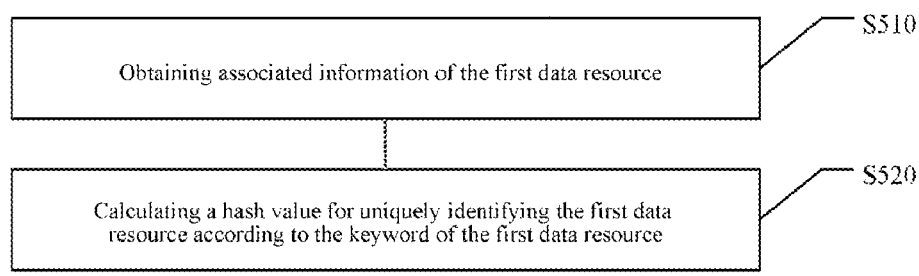
FIG. 5 shows a schematic flowchart of determining a hash value of data resource in an embodiment of the present disclosure.

When the first data resource is a static resource, especially when the data amount of the first data resource is relatively large, the hash value for uniquely identifying the first data resource may also be determined through steps S510 to S520 as shown in FIG. 5. In particular:

In step S510, obtaining associated information of the first data resource.

In this exemplary embodiment, the associated information of the first data resource may include keyword information that can uniquely identify the first data resource. For example, the keyword information may include content name, content size, format, time information, etc. of the first data resource. For example, if the first data resource is streaming media, the keyword information may specifically include streaming media name, streaming media size, encoding format, frame rate or time information, etc.; if the first data resource is a file, the keyword information may specifically include file name, file size, file format, file list, creation/modification time, etc. In some exemplary embodiments, the associated information may also include a keyword generation method that uniquely identifies the first data resource, for example, how to extract the abstract information of the first data resource as a keyword, and the like. This is not specifically limited in this exemplary embodiment.

In some exemplary embodiments, the associated information may further include slicing rule information for the first data resource. The slicing rule information describes how a data resource is decomposed into relatively small data fragments; for example, for a video file, it can be sliced according to time, such as dividing video data into one piece per minute; it can also be sliced according to a fixed size, such as dividing every 4 kB of video data into one piece, etc.

Next, according to the slicing rule information and the file name of the first data resource, a keyword for uniquely identifying each sliced data resource can be determined; for example, a slicing number is added as a keyword in the above-mentioned associated information.

In step S520, calculating a hash value for uniquely identifying the first data resource according to the keyword of the first data resource.

In this exemplary embodiment, SHA-1 may be used to perform hash conversion on the keyword of the first data resource to obtain a corresponding hash value. Wherein, SHA-1 is a cryptographic hash function with a hash space of 160 bits; therefore, the length of the generated hash value for uniquely identifying the first data resource is 160 bits, that is, 20 bytes. Of course, in other exemplary embodiments of the present disclosure, other hash functions such as MD5 and SHA-2 may also be used to calculate the hash value, which is not specifically limited in this exemplary embodiment.

Figure 6:
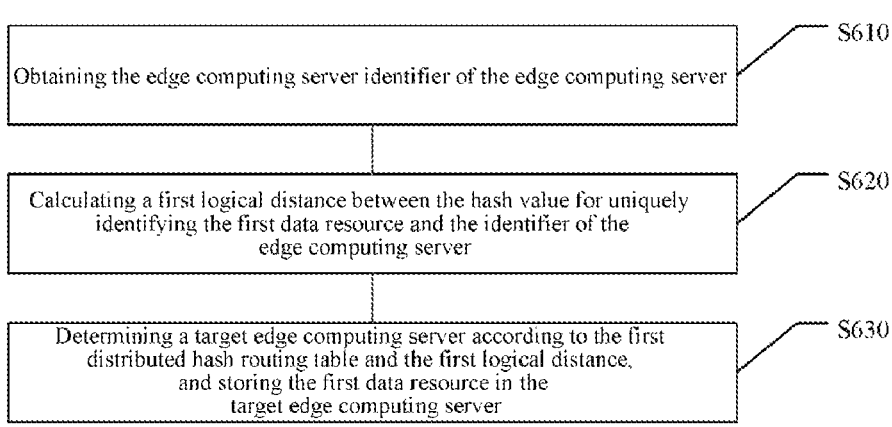
FIG. 6 shows a schematic flowchart of determining a target edge computing server in an embodiment of the present disclosure.

After determining the hash value of the first data resource, as shown in FIG. 6, in this exemplary embodiment, the first data resource may be stored in at least one edge computing server in the edge node to which the edge computing server belongs through the following steps S610 to S630. In particular:

In step S610, obtaining the identifier of the edge computing server.

In this exemplary embodiment, the value range of the identifier of the edge computing server is the same as the value range of the hash value of the first data resource. For example, in the above-mentioned exemplary embodiments, the hash value of the first data resource is a 160-bit hash value obtained by hash conversion of the keyword of the first data resource using SHA-1; it is also necessary to use SHA-1 to perform hash conversion on the keyword for uniquely identifying the edge computing server to obtain a corresponding 160-bit hash value. If the hash value of the first data resource is obtained by using MD5, the hash value of the edge computing server also needs to be obtained by using MD5. Wherein, the keyword for uniquely identifying the edge computing server may be the MAC address of the edge computing server, the device serial number, IMEI (International Mobile Equipment Identity) and the like.

In step S620, calculating a first logical distance between the hash value for uniquely identifying the first data resource and the identifier of the edge computing server.

In this exemplary embodiment, the first distance value can be obtained by XOR operation between the first N bits of the hash value of the first data resource and the first N bits of the hash value (i.e., the edge computing server identifier) of the edge computing server (in order to distinguish it from other edge computing servers, hereinafter referred to as the current edge computing server). Wherein, N is a positive integer, and N is the same as the number of K buckets in the first distributed hash routing table.

Figure 7:
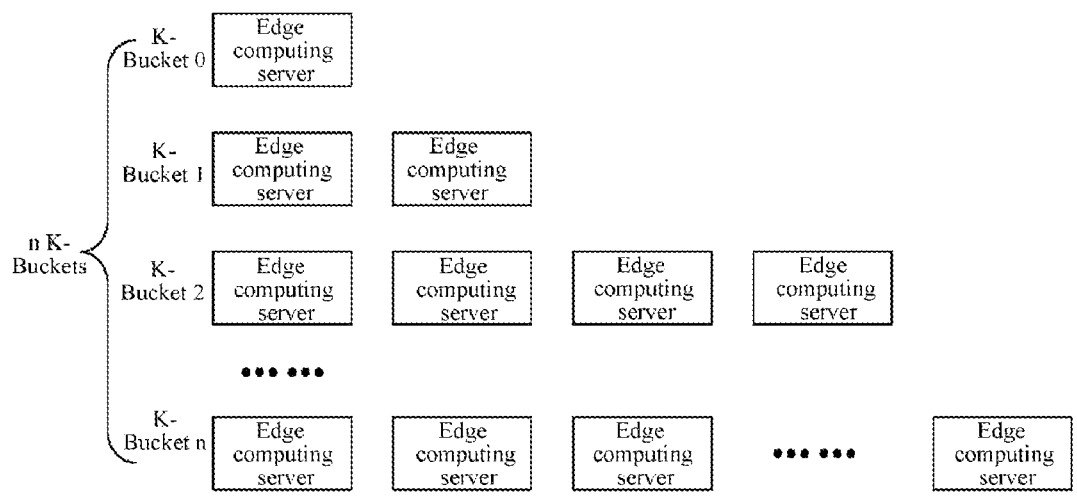
FIG. 7 shows a schematic structural diagram of a K-barrel in an embodiment of the present disclosure.

It should be noted that, in this exemplary embodiment, each edge computing server in the edge node is represented by a corresponding hash value, and the hash value is stored in the first distributed hash routing table. Each edge computing server maintains a first distributed hash routing table; FIG. 7 shows a schematic diagram of a first distributed hash routing table, which includes N lists, each list is called one K bucket (K-Bucket). As shown in FIG. 7, the first distributed hash routing table maintained by the edge computing server includes N K-Buckets, which are K-Bucket 0 to K-Bucket N respectively. Each K-Bucket contains information about edge computing servers with the same logical distance; for example, K-Bucket 0 contains information about edge computing servers with a logical distance of 0 from the edge computing server where it resides, K-Bucket 1 contains information about the edge computing servers with a logical distance of 1 from the edge computing server where it resides, K-Bucket n contains the information of edge computing servers with a logical distance of n from the edge computing server where it resides; each K-Bucket stores hash values, IP addresses and port numbers of the corresponding edge computing servers. If the number of K-Buckets in the first distributed hash routing table maintained by the current edge computing server is 16, the first distance value is obtained by XOR operation between the first 16 bits of the hash value of the first data resource and the first 16 bits of the hash value of the current edge computing server.

Secondly, the first logarithm value is obtained by calculating the logarithm based on 2 of the first distance value; the first logical distance between the hash value of the first data resource and the hash value of the current edge computing server according to the difference between N and the first logarithm value. Specifically, obtain the difference between N and the first logarithm value by subtracting the first logarithm value from N, and take the integer of the difference or the rounded integer of the difference as the first logical distance between the hash value of the first data resource and the hash value of the current edge computing server; the obtained first logical distance is an integer in the range [0, N].

In step S630, determining a target edge computing server according to the first distributed hash routing table and the first logical distance, and storing the first data resource in the target edge computing server.

For example, after calculating the first logical distance L1 between the hash value of the first data resource and the hash value of the current edge computing server, in the exemplary embodiment, an edge computing server with a logical distance of the first logical distance L1 is selected from the first distributed hash routing table maintained by the current edge computing server as the target edge computing server. For example, if the calculated first logical distance L1 is 5, query K-Bucket 5 from the first distributed hash routing table maintained by the current edge computing server, and determine the target edge computing server according to K-Bucket 5.

In addition, if there is no edge computing server with a logical distance of the first logical distance L1 in the first distributed hash routing table maintained by the current edge computing server, an edge computing server corresponding to a logical distance close to the first logical distance L1 is selected from the first distributed hash routing table maintained by the current edge computing server as the current edge computing server, and the above steps S620 to S630 are repeated until the target edge computing server is determined.

After the target edge computing server is determined, the first data resource may be stored in the target edge computing server.

In step S420, in response to the edge node obtaining the second data resource, storing the second data resource in at least one edge node in the edge computing system based on the second distributed hash routing table maintained by the edge node and the hash value for uniquely identifying the second data resource.

In this exemplary embodiment, the associated information of the second data resource may be obtained, the associated information includes a keyword or a keyword generation method for uniquely identifying the second data resource; and a hash value for uniquely identifying the second data resource is calculated according to the keyword of the second data resource. That is, the method for obtaining the hash value of the second data resource is similar to the above step S510 to step S520, so it will not be repeated here. In addition, it should be noted that the second data resource may be same as or different from the above-mentioned first data resource, and no special distinction is made in this exemplary embodiment.

Figure 8:
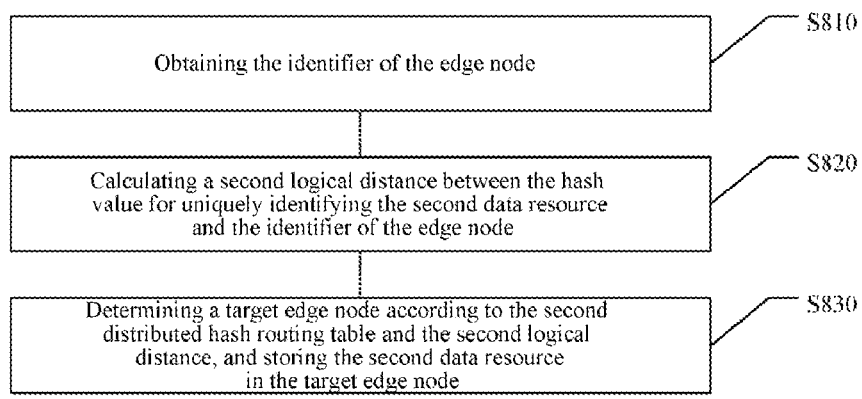
FIG. 8 shows a schematic flowchart of determining a target edge node in an embodiment of the present disclosure.

After determining the hash value of the second data resource, as shown in FIG. 8, in this exemplary embodiment, the second data resource may be stored in at least one of the edge computing systems through the following steps S810 to S830 edge nodes. In particular:

In step S810, obtaining the identifier of the edge node.

In this exemplary embodiment, the value range of the identifier of the edge node is the same as the value range of the hash value of the above-mentioned second data resource. For example, if the hash value of the second data resource is a 160-bit hash value obtained by performing hash conversion on the keyword of the second data resource using SHA-1, then it is also necessary to use SHA-1 to perform hash conversion on the keyword for uniquely identifying the edge node to obtain a corresponding 160-bit hash value. If the hash value of the second data resource is obtained by using MD5, the hash value of the edge node also needs to be obtained by using MD5. Wherein, the keyword for uniquely identifying the edge node may be a serial number, a GUID (Globally Unique Identifier) of the edge node, and the like.

In step S820, calculating a second logical distance between the hash value for uniquely identifying the second data resource and the identifier of the edge node.

In this exemplary embodiment, firstly, the second distance value can be obtained by XOR operation between the first N bits of the hash value of the second data resource and the first N bits of the hash value (i.e., the edge node identifier) of the edge node (in order to distinguish it from other edge nodes, hereinafter referred to as the current edge node). Wherein, N is a positive integer, and N is the same as the number of K buckets in the second distributed hash routing table.

It should be noted that, in this exemplary embodiment, each edge node is represented by a corresponding hash value, and the hash value is stored in the second distributed hash routing table. Each edge node maintains a second distributed hash routing table. The second distributed hash routing table maintained by the edge node includes N K-Buckets, which are K-Bucket 0 to K-Bucket N respectively. Each K-Bucket contains information about edge nodes with the same logical distance; for example, K-Bucket 0 contains information about edge nodes with a logical distance of 0 from the edge node where it resides, K-Bucket 1 contains information about the edge nodes with a logical distance of 1 from the edge node where it resides, K-Bucket n contains the information of edge nodes with a logical distance of n from the edge node where it resides; each K-Bucket stores hash values, IP addresses and port numbers of the corresponding edge nodes. If the number of K-Buckets in the second distributed hash routing table maintained by the current edge node is 16, then the second distance value is obtained by XOR operation between the first 16 bits of the hash value of the second data resource and the first 16 bits of the hash value of the current edge node.

Secondly, the first logarithm value is obtained by calculating the logarithm based on 2 of the second distance value; the second logical distance between the hash value of the second data resource and the hash value of the current edge node according to the difference between N and the first logarithm value. Specifically, obtain the difference between N and the first logarithm value by subtracting the first logarithm value from N, and take the integer of the difference or the rounded integer of the difference as the second logical distance between the hash value of the second data resource and the hash value of the current edge node; the obtained second logical distance is an integer in the range [0, N].

In step S830, determining a target edge node according to the second distributed hash routing table and the second logical distance, and storing the second data resource in the target edge node.

For example, after calculating the second logical distance L2 between the hash value of the second data resource and the hash value of the current edge node, in the exemplary embodiment, an edge node with a logical distance of the second logical distance L2 is selected from the second distributed hash routing table maintained by the current edge node as the target edge node. For example, if the calculated second logical distance L2 is 5, query K-Bucket 5 from the second distributed hash routing table maintained by the current edge node, and determine the target edge node according to K-Bucket 5.

In addition, if there is no edge node with a logical distance of the second logical distance L2 in the second distributed hash routing table maintained by the current edge node, an edge node corresponding to a logical distance close to the second logical distance L2 is selected from the second distributed hash routing table maintained by the current edge node as the current edge node, and the above steps S820 to S830 are repeated until the target edge node is determined.

After the target edge node is determined, the second data resource may be stored in the target edge node.

In the above exemplary embodiments, the data resource can be stored in either the edge computing server or the edge node. But it can be preferentially stored in the P2P network where the receiver is located. For example, the data resources obtained by an edge computing server are preferentially stored in the P2P network formed by a plurality of edge computing servers in the edge node where the edge computing server is located. The data resources obtained by edge nodes are preferentially stored in the P2P network composed of edge nodes. In addition, after the edge computing server obtains the first data resource, if the edge node to which the edge computing server belongs cannot store the first data resource (such as insufficient storage space, low transmission bandwidth, high delay, etc.), then the edge node to which the edge computing server belongs stores the first data resource in at least one edge node in the edge computing system based on the second distributed hash routing table and the hash value for uniquely identifying the first data resource. The method of storing data resources in at least one edge node in the edge computing system has been described in detail in the above step S420, so it will not be repeated here. That is to say, through the method in this exemplary embodiment, cross-edge data resource storage can also be realized.

Figure 9:
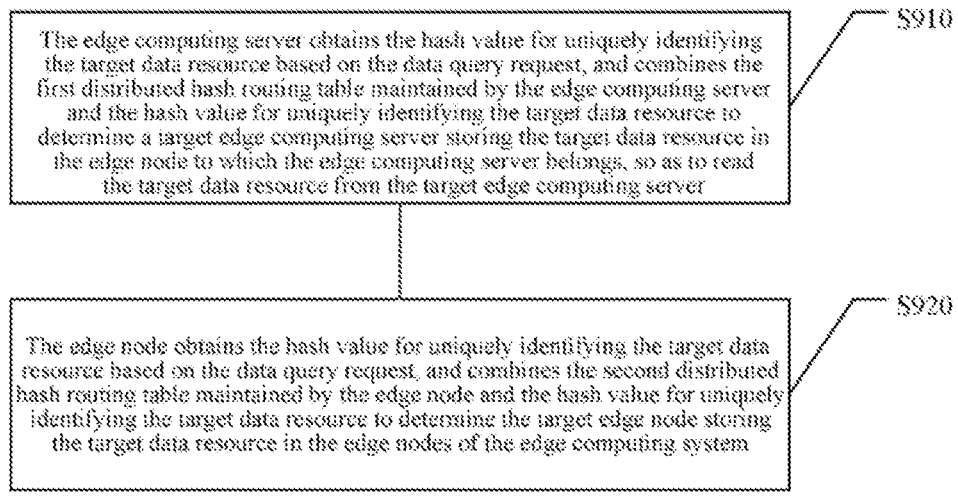
FIG. 9 shows a schematic flowchart of a data resource query method in an embodiment of the present disclosure.

This exemplary embodiment provides a data resource query method, which is applied to the above-mentioned edge computing system. Referring to FIG. 9, the data resource query method may include the following step S910 and/or step S920. In particular:

In step S910, the edge computing server obtains the hash value for uniquely identifying the target data resource based on the data query request, and combines the first distributed hash routing table maintained by the edge computing server and the hash value for uniquely identifying the target data resource to determine a target edge computing server storing the target data resource in the edge node to which the edge computing server belongs, so as to read the target data resource from the target edge computing server.

In this exemplary embodiment, the hash value of the target data resource may be pre-published on a public network or stored in a designated location for acquisition by the query terminal. After the query terminal obtains the hash value of the target data resource, the above data query request carrying the hash value of the target data resource may be generated based on the hash value of the target data resource.

In some exemplary embodiments, the associated information of the target data resource may also be pre-published on the public network or stored in a designated location for acquisition by the query terminal; wherein the associated information includes a keyword that uniquely identifies the target data resource or keyword generation method. Furthermore, after the query terminal obtains the associated information of the target data resource, a hash value for uniquely identifying the target data resource may be calculated according to the keyword of the target data resource. The method for obtaining the hash value of the target data resource is similar to the above step S510 to step S520, so it will not be repeated here.

Figure 10:
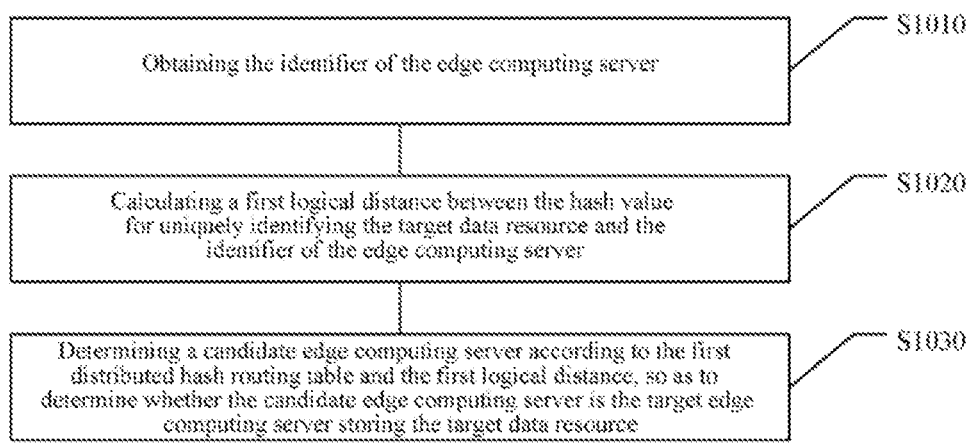
FIG. 10 shows a schematic flowchart of determining a target edge computing server in an embodiment of the present disclosure.

After obtaining the hash value of the target data resource, as shown in FIG. 10, in this exemplary embodiment, the target edge computing server storing the target data resource may be determined through the following steps S1010 to S1030. In particular:

In step S1010, obtaining the identifier of the edge computing server. This step is similar to the above step S610, so it will not be repeated here.

In step S1020, calculating a first logical distance between the hash value for uniquely identifying the target data resource and the identifier of the edge computing server. This step is similar to the above step S620, so it will not be repeated here.

In step S1030, determining a candidate edge computing server according to the first distributed hash routing table and the first logical distance, so as to determine whether the candidate edge computing server is the target edge computing server storing the target data resource.

For example, after calculating the first logical distance L1 between the hash value of the target data resource and the hash value of the current edge computing server, in this exemplary embodiment, an edge computing server with a logical distance of the first logical distance L1 can be selected from the second distributed hash routing table maintained by the current edge computing server as the candidate edge computing server. For example, if the calculated first logical distance L1 is 5, then query the K-Bucket 5 from the second distributed hash routing table maintained by the current edge computing server, and determine the candidate edge computing server according to the K-Bucket 5.

In addition, if there is no edge computing server with a logical distance of the first logical distance L1 in the second distributed hash routing table maintained by the current edge computing server, then an edge computing server corresponding to a logical distance close to the first logical distance L1 can be selected from the second distributed hash routing table maintained by the current edge computing server as the current edge computing server, and the above steps S1020 to S1030 are repeated until a candidate edge computing server is determined.

After the candidate edge computing server is determined, it may be inquired whether the candidate edge computing server stores the target data resource; if the candidate edge computing server stores the target resource, then the candidate edge computing server is determined as the target edge computing server.

In step S920, the edge node obtains the hash value for uniquely identifying the target data resource based on the data query request, and combines the second distributed hash routing table maintained by the edge node and the hash value for uniquely identifying the target data resource to determine the target edge node storing the target data resource in the edge nodes of the edge computing system.

Figure 11:
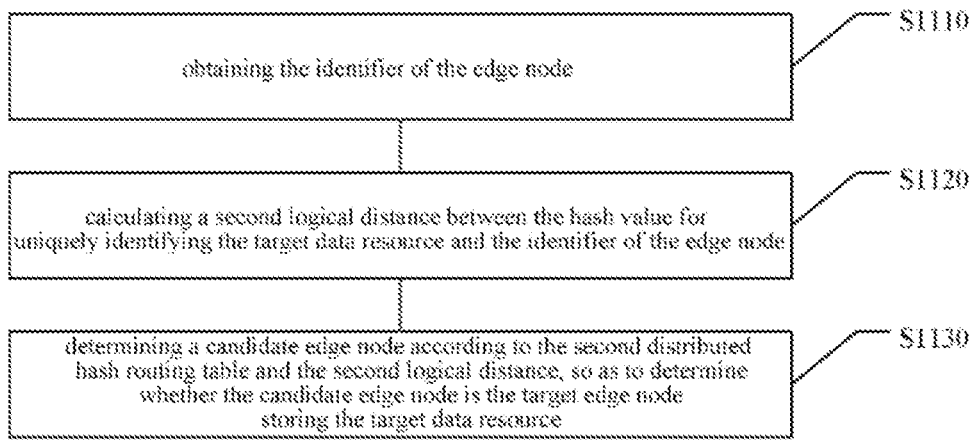
FIG. 11 shows a schematic flowchart of determining a target edge node in an embodiment of the present disclosure.

After obtaining the hash value of the target data resource, as shown in FIG. 11, in this exemplary embodiment, the target edge node storing the target data resource may be determined through the following steps S1110 to S1130. In particular:

In step S1110, obtaining the identifier of the edge node. This step is similar to the above step S810, so it will not be repeated here.

In step S1120, calculating a second logical distance between the hash value for uniquely identifying the target data resource and the identifier of the edge node. This step is similar to the above step S820, so it will not be repeated here.

In step S1130, determining a candidate edge node according to the second distributed hash routing table and the second logical distance, so as to determine whether the candidate edge node is the target edge node storing the target data resource.

For example, after calculating the second logical distance L2 between the hash value of the second data resource and the hash value of the current edge node, in this exemplary embodiment, an edge node with a logical distance of the second logical distance L2 can be selected from the second distributed hash routing table maintained by the current edge node as the candidate edge node. For example, if the calculated second logical distance L2 is 5, query the K-Bucket 5 from the second distributed hash routing table maintained by the current edge node, and determine the candidate edge node according to the K-Bucket 5.

In addition, if there is no edge node with a logical distance of the second logical distance L2 in the second distributed hash routing table maintained by the current edge node, an edge node corresponding to a logical distance close to the second logical distance L2 can be selected from the second distributed hash routing table maintained by the current edge node as the above-mentioned current edge node, and the above-mentioned steps S1120 to S1130 are repeated until a candidate edge node is determined.

After the candidate edge node is determined, it can be inquired whether the candidate edge node stores the target data resource; if the candidate edge node stores the target resource, then the candidate edge node is determined as the target edge node in order to read the target data resource from the target edge node.

In the above exemplary embodiments, step S910 and step S920 can be executed at the same time, that is, the target data resource can be queried in the P2P network where the edge computing server is located and the P2P where the edge node is located at the same time; or only step S910 or only step S920 can be executed. In some exemplary embodiments, step S910 and step S920 may be performed in a preset order, that is, queries are performed in a preset order. For example, the target data resource can be queried preferentially in the P2P network formed by the edge computing servers in the edge node where the edge computing server is located. If the target data resource is not stored in the P2P network formed by the edge computing servers or the transmission bandwidth is too low, then the edge node to which the edge computing server belongs can query the target data resource in the P2P where the edge node is located based on the second distributed hash routing table and the hash value for uniquely identifying the target data resource. That is, through the method in this exemplary embodiment, it is also possible to realize cross-edge data resource query.

It should be understood that although the various steps in the flow chart of the accompanying drawings are displayed sequentially according to the arrows, these steps are not necessarily executed sequentially in the order indicated by the arrows. Unless otherwise indicated herein, there is no strict order restriction on the execution of these steps, and they can be executed in other orders. Moreover, at least some of the steps in the flowcharts of the accompanying drawings may include multiple sub-steps or multiple stages, and these sub-steps or stages are not necessarily executed at the same time, but may be executed at different times, and the order of execution is not necessarily performed sequentially, but may be performed alternately or by turns with other steps, or sub-steps of other steps or at least a part of stages.

Further, an edge computing system is also provided in this exemplary embodiment. Referring to the above FIG. 1, the edge computing system includes a plurality of edge nodes and at least one of the edge nodes includes a plurality of edge computing servers; wherein: the plurality of edge computing servers form a first P2P network based on a first distributed hash routing table, and the edge computing server stores hash values for identifying data resources stored thereon; the plurality of edge nodes form a second P2P network based on a second distributed hash routing table, and the edge nodes store hash values for identifying data resources stored thereon.

Figure 12:
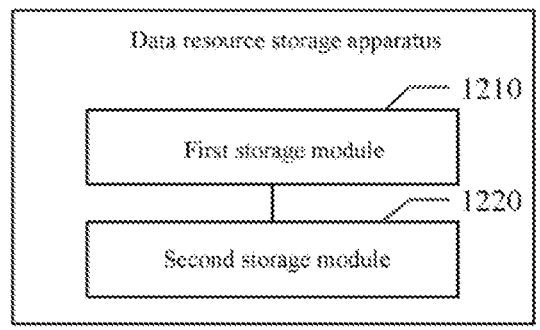
FIG. 12 shows a schematic diagram of modules of a data resource storage apparatus in an embodiment of the present disclosure.

Further, this exemplary embodiment also provides a data resource storage apparatus, which is applied to an edge computing system, where the edge computing system includes a plurality of edge nodes and at least one of the edge nodes includes a plurality of edge computing servers. Referring to FIG. 12, the data resource storage apparatus 1200 may include a first storage module 1210 and a second storage module 1220. In particular:

The first storage module 1210 may be configured to store the first data resource in at least one edge computing server in the edge node to which the edge computing server belongs based on the first distributed hash routing table maintained by the edge computing server and the hash value for uniquely identifying the first data resource, in response to the edge computing server obtaining the first data resource. The second storage module 1220 may be configured to store the second data resource in at least one edge node in the edge computing system based on the second distributed hash routing table maintained by the edge node and the hash value for uniquely identifying the second data resource, in response to the edge node obtaining the second data resource; wherein, edge computing servers in the edge node to which the edge computing server belongs form a first P2P network; edge nodes in the edge computing system form a second P2P network.

Figure 13:
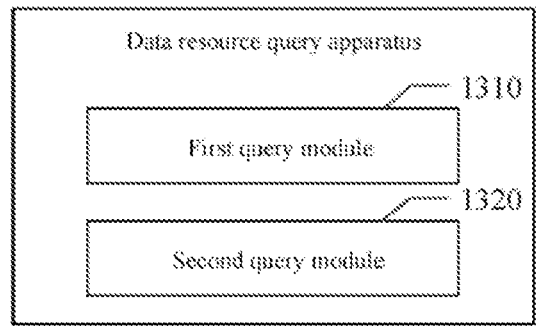
FIG. 13 shows a schematic diagram of modules of a data resource query apparatus in an embodiment of the present disclosure.

Further, this exemplary embodiment also provides a data resource query apparatus, which is applied to an edge computing system, where the edge computing system includes a plurality of edge nodes and at least one of the edge nodes includes a plurality of edge computing servers. Referring to FIG. 13, the data resource query apparatus 1300 may include a first query module 1310 and/or a second query module 1320. In particular:

The first query module 1310 can be configured to enable the edge computing server to obtain a hash value for uniquely identifying the target data resource based on the data query request, and combine the first distributed hash routing table maintained by the edge computing server to determine a target edge computing server storing the target data resource in the edge node to which the edge computing server belongs, so as to read the target data resource from the target edge computing server. The second query module 1320 may be configured to enable the edge node to obtain a hash value for uniquely identifying the target data resource based on the data query request, and combine the second distributed hash routing table maintained by the edge node to determine a target edge node storing the target data resource in edge nodes of the edge computing system, so as to read the target data resource from the target edge node. Wherein, edge computing servers in the edge node to which the edge computing server belongs form a first P2P network; edge nodes in the edge computing system forms a second P2P network.

The specific details of modules and components in the above-mentioned edge computing system, data resource storage apparatus, and data resource query apparatus have been described in detail in the corresponding data resource storage method or data resource query method, so they will not be repeated here.

It should be noted that although several modules or components of an apparatus for action execution are mentioned in the above detailed description, this division is not mandatory. Actually, according to the embodiment of the present disclosure, the features and functions of two or more modules or components described above may be embodied in one module or unit. Conversely, the features and functions of one module or one unit described above can be further divided to be embodied by a plurality of modules or units.

The various component embodiments of the present disclosure may be implemented in hardware, or in software modules running on one or more processors, or in a combination thereof.

In an exemplary embodiment of the present disclosure, there is also provided an electronic device, including: a processor; a memory configured to store processor-executable instructions; where the processor is configured to perform any method described in the exemplary embodiments.

Figure 14:
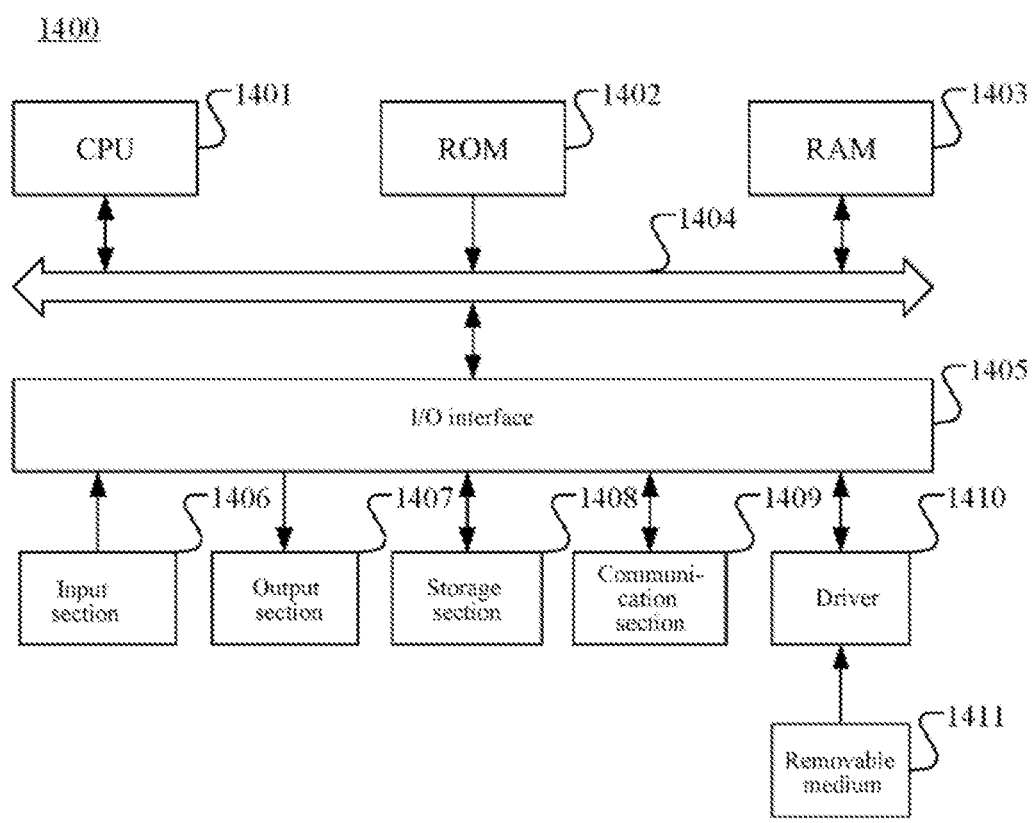
FIG. 14 shows a schematic structural diagram of a computer system for realizing the electronic device of the embodiment of the present disclosure.

FIG. 14 is a schematic structural diagram of a computer system for realizing the electronic device of the embodiment of the present disclosure. It should be noted that the computer system 1400 of the electronic device shown in FIG. 14 is only an example, and should not limit the functions and scope of use of the embodiments of the present disclosure.

As shown in FIG. 14, a computer system 1400 includes a central processing unit 1401, which can perform various appropriate actions and processes according to programs stored in a read-only memory 1402 or loaded from a storage section 1408 into a random access memory 1403. In random access memory 1403, various programs and data necessary for system operation are also stored. The CPU 1401, the ROM 1402 and the RAM 1403 are connected to each other through a bus 1404. The input/output interface 1405 is also connected to the bus 1404.

The following components are connected to the input/output interface 1405: an input section 1406 including a keyboard, a mouse, etc.; an output section 1407 including a cathode ray tube (CRT), a liquid crystal display (LCD), etc., and a speaker; a storage section 1408 including a hard disk, etc. and a communication section 1409 including a network interface card such as a local area network (LAN) card, a modem, or the like. The communication section 1409 performs communication processing via a network such as the Internet. A driver 1410 is also connected to the input/output interface 1405 as needed. A removable medium 1411 such as a magnetic disk, optical disk, magneto-optical disk, semiconductor memory, etc. is mounted on the drive 1410 as necessary so that a computer program read therefrom is installed into the storage section 1408 as necessary.

In particular, according to an embodiment of the present disclosure, the processes described above with reference to the flowcharts can be implemented as computer software programs. For example, embodiments of the present disclosure include a computer program product, which includes a computer program carried on a computer-readable medium, where the computer program includes program codes for executing the methods shown in the flowcharts. In such an embodiment, the computer program may be downloaded and installed from a network via communication portion 1409 and/or installed from removable media 1411. When the computer program is executed by the central processing unit 1401, various functions defined in the apparatus of the present application are executed.

In an exemplary embodiment of the present disclosure, there is also provided a non-volatile computer-readable storage medium on which a computer program is stored, and when the computer program is executed by a computer, the computer executes any one of the methods described above.

It should be noted that the non-volatile computer-readable storage medium shown in the present disclosure may be, for example, but not limited to, an electrical, magnetic, optical, electromagnetic, infrared, or semiconductor system, apparatus, or device, or any of the above combination. More specific examples of computer-readable storage media may include, but are not limited to, electrical connections with one or more wires, portable computer diskettes, hard disks, random access memory, read-only memory, erasable programmable read-only memory (EPROM or flash memory), fiber optics, portable compact disk read-only memory (CD-ROM), optical storage devices, magnetic storage devices, or any suitable combination of the foregoing. In the present disclosure, a computer-readable storage medium may be any tangible medium that contains or stores a program that can be used by or in conjunction with an instruction execution system, apparatus, or device. In the present disclosure, however, a computer-readable signal medium may include a data signal propagated in baseband or as part of a carrier wave, carrying computer-readable program code therein. Such propagated data signals may take many forms, including but not limited to electromagnetic signals, optical signals, or any suitable combination of the foregoing. A computer-readable signal medium may also be any computer-readable medium other than a computer-readable storage medium, which can send, propagate, or transmit a program for use by or in conjunction with an instruction execution system, apparatus, or device. Program code embodied on a computer readable medium may be transmitted using any appropriate medium, including but not limited to wireless, wire, optical cable, radio frequency, etc., or any suitable combination of the above.

Other embodiments of the disclosure will be readily apparent to those skilled in the art from consideration of the specification and practice of the invention disclosed herein. This application is intended to cover any modification, use or adaptation of the present disclosure, and these modifications, uses or adaptations follow the general principles of the present disclosure and include common knowledge or conventional technical means in the technical field not disclosed in the present disclosure. The specification and embodiments are to be considered exemplary only, with the true scope and spirit of the disclosure indicated by the appended claims.

What is claimed is:

1. A data resource storage method, applied to an edge computing system, the edge computing system comprises a plurality of edge nodes and at least one of the edge nodes comprises a plurality of edge computing servers; wherein the data resource storage method comprises:
   in response to a first edge computing server obtaining a first data resource, storing the first data resource in at least one edge computing server in a first edge node to which the first edge computing server belongs based on a first distributed hash routing table maintained by the edge computing server and a hash value for uniquely identifying the first data resource; and
   in response to a second edge node obtaining a second data resource, storing the second data resource in at least one edge node in the edge computing system based on a second distributed hash routing table maintained by the edge node and a hash value for uniquely identifying the second data resource;
   wherein, the edge computing servers in the first edge node to which the first edge computing server belongs form a first layer of P2P network; and edge nodes in the edge computing system form a second layer of P2P network,
   wherein the method further comprises:
   obtaining associated information of the first data resource, wherein the associated information comprises a keyword that uniquely identifies the first data resource or a keyword generating method; and calculating the hash value for uniquely identifying the first data resource based on the keyword of the first data resource; and
   obtaining associated information of the second data resource, wherein the associated information comprises a keyword that uniquely identifies the second data resource or a keyword generating method; and calculating the hash value for uniquely identifying the second data resource based on the keyword of the second data resource.

2. The data resource storage method according to claim 1, further comprising:
   after the first edge computing server obtains the first data resource, in response to that the first edge node to which the first edge computing server belongs cannot store the first data resource, storing, by the first edge node to which the first edge computing server belongs, the first data resource in at least one edge node in the edge computing system based on the second distributed hash routing table and the hash value for uniquely identifying the first data resource.

3. The data resource storage method according to claim 1, wherein the first edge computing server has a first identifier, and a value range of the first identifier is same as a value range of the hash value for uniquely identifying the first data resource; said storing the first data resource in at least one edge computing server in the first edge node to which the first edge computing server belongs comprises:
   obtaining the first identifier;
   calculating a first logical distance between the hash value for uniquely identifying the first data resource and the first identifier; and determining a target edge computing server according to the first distributed hash routing table and the first logical distance, and storing the first data resource in the target edge computing server.

4. The data resource storage method according to claim 1, wherein the second edge node has a second identifier, and a value range of the second identifier is same as a value range of the hash value for uniquely identifying the second data resource; said storing the second data resource in at least one edge node in the edge computing system comprises:
obtaining the second identifier;
calculating a second logical distance between the hash value for uniquely identifying the second data resource and the second identifier; and
determining a target edge node according to the second distributed hash routing table and the second logical distance, and storing the second data resource in the target edge node.

5. A data resource query method, applied to an edge computing system, the edge computing system comprises a plurality of edge nodes and at least one of the edge nodes comprises a plurality of edge computing servers; wherein the data resource query method comprises:
obtaining, by a first edge computing server, a hash value for uniquely identifying a target data resource based on a data query request, and determining a target edge computing server storing the target data resource in a first edge node to which the first edge computing server belongs by combining a first distributed hash routing table maintained by the first edge computing server and the hash value for uniquely identifying a target data resource, so as to read the target data resource from the target edge computing server; and/or
obtaining, by a second edge node, a hash value for uniquely identifying a target data resource based on a data query request, and determining a target edge node storing the target data resource in the edge nodes of the edge computing system by combining a second distributed hash routing table maintained by the second edge node and the hash value for uniquely identifying the target data resource, so as to read the target data resource from the target edge node;
wherein, the edge computing servers in the first edge node to which the first edge computing server belongs form a first layer of P2P network; and the edge nodes in the edge computing system form a second layer of P2P network,
wherein the method further comprises:
obtaining associated information of the target data resource, wherein the associated information comprises a keyword that uniquely identifies the target data resource or a keyword generating method; and calculating the hash value for uniquely identifying the target data resource based on the keyword of the target data resource.

6. The data resource query method according to claim 5, wherein said determining the target edge computing server storing the target data resource comprises:
obtaining a first identifier of the first edge computing server;
calculating a first logical distance between the hash value for uniquely identifying the target data resource and the first identifier; and
determining a candidate edge computing server according to the first distributed hash routing table and the first logical distance, so as to determine whether the candidate edge computing server is the target edge computing server storing the target data resource.

7. The data resource query method according to claim 5, wherein said determining the target edge node storing the target data resource comprises:
obtaining a second identifier of the second edge node;
calculating a second logical distance between the hash value for uniquely identifying the target data resource and the second identifier; and
determining a candidate edge node according to the second distributed hash routing table and the second logical distance, so as to determine whether the candidate edge node is the target edge node storing the target data resource.

8. An electronic device, applied to an edge computing system, the edge computing system comprises a plurality of edge nodes and at least one of the edge nodes comprises a plurality of edge computing servers, wherein the electronic device comprises:
a processor; and
a memory for storing executable instructions of the processor;
wherein the processor is configured to execute the executable instructions in the memory to:
in response to a first edge computing server obtaining a first data resource, store the first data resource in at least one edge computing server in a first edge node to which the first edge computing server belongs based on a first distributed hash routing table maintained by the edge computing server and a hash value for uniquely identifying the first data resource; and
in response to a second edge node obtaining a second data resource, store the second data resource in at least one edge node in the edge computing system based on a second distributed hash routing table maintained by the edge node and a hash value for uniquely identifying the second data resource;
wherein, the edge computing servers in the first edge node to which the first edge computing server belongs form a first layer of P2P network; and edge nodes in the edge computing system form a second layer of P2P network,
wherein the processor is further configured to execute the executable instructions in the memory to:
obtain associated information of the first data resource, wherein the associated information comprises a keyword that uniquely identifies the first data resource or a keyword generating method; and calculate the hash value for uniquely identifying the first data resource based on the keyword of the first data resource; and
obtain associated information of the second data resource, wherein the associated information comprises a keyword that uniquely identifies the second data resource or a keyword generating method; and calculate the hash value for uniquely identifying the second data resource based on the keyword of the second data resource.

9. The electronic device according to claim 8, wherein the processor is further configured to execute the executable instructions in the memory to:
after the first edge computing server obtains the first data resource, in response to that the first edge node to which the first edge computing server belongs cannot store the first data resource, storing, by the first edge node to which the first edge computing server belongs, the first data resource in at least one edge node in the edge computing system based on the second distributed hash routing table and the hash value for uniquely identifying the first data resource.

10. The electronic device according to claim 8, wherein the first edge computing server has a first identifier, and a value range of the first identifier is same as a value range of the hash value for uniquely identifying the first data resource; said storing the first data resource in at least one edge computing server in the first edge node to which the first edge computing server belongs comprises:
- obtaining the first identifier;
- calculating a first logical distance between the hash value for uniquely identifying the first data resource and the first identifier; and
- determining a target edge computing server according to the first distributed hash routing table and the first logical distance, and storing the first data resource in the target edge computing server.

11. The electronic device according to claim 8, wherein the second edge node has a second identifier, and a value range of the second identifier is same as a value range of the hash value for uniquely identifying the second data resource; said storing the second data resource in at least one edge node in the edge computing system comprises:
- obtaining the second identifier;
- calculating a second logical distance between the hash value for uniquely identifying the second data resource and the second identifier; and
- determining a target edge node according to the second distributed hash routing table and the second logical distance, and storing the second data resource in the target edge node.

12. The data resource storage method according to claim 1, wherein the first edge computing server has a first identifier, and a value range of the first identifier is same as a value range of the hash value for uniquely identifying the first data resource; said storing the first data resource in at least one edge computing server in the first edge node to which the first edge computing server belongs comprises:
- obtaining the first identifier;
- calculating a first logical distance between the hash value for uniquely identifying the first data resource and the first identifier; and
- determining a target edge computing server according to the first distributed hash routing table and the first logical distance, and storing the first data resource in the target edge computing server.

13. The data resource storage method according to claim 2, wherein the first edge computing server has a first identifier, and a value range of the first identifier is same as a value range of the hash value for uniquely identifying the first data resource; said storing the first data resource in at least one edge computing server in the first edge node to which the first edge computing server belongs comprises:
- obtaining the first identifier;
- calculating a first logical distance between the hash value for uniquely identifying the first data resource and the first identifier; and
- determining a target edge computing server according to the first distributed hash routing table and the first logical distance, and storing the first data resource in the target edge computing server.

14. The data resource storage method according to claim 1, wherein the second edge node has a second identifier, and a value range of the second identifier is same as a value range of the hash value for uniquely identifying the second data resource; said storing the second data resource in at least one edge node in the edge computing system comprises:
- obtaining the second identifier;
- calculating a second logical distance between the hash value for uniquely identifying the second data resource and the second identifier; and
- determining a target edge node according to the second distributed hash routing table and the second logical distance, and storing the second data resource in the target edge node.

15. The data resource storage method according to claim 2, wherein the second edge node has a second identifier, and a value range of the second identifier is same as a value range of the hash value for uniquely identifying the second data resource; said storing the second data resource in at least one edge node in the edge computing system comprises:
- obtaining the second identifier;
- calculating a second logical distance between the hash value for uniquely identifying the second data resource and the second identifier; and
- determining a target edge node according to the second distributed hash routing table and the second logical distance, and storing the second data resource in the target edge node.

* * * * *